Feb. 24, 1925.
C. R. RANEY
GRAIN SHOCKER
Filed April 17, 1922    3 Sheets-Sheet 1

1,527,821

Inventor.
Clemma R. Raney,
By H. P. Doolittle
Atty.

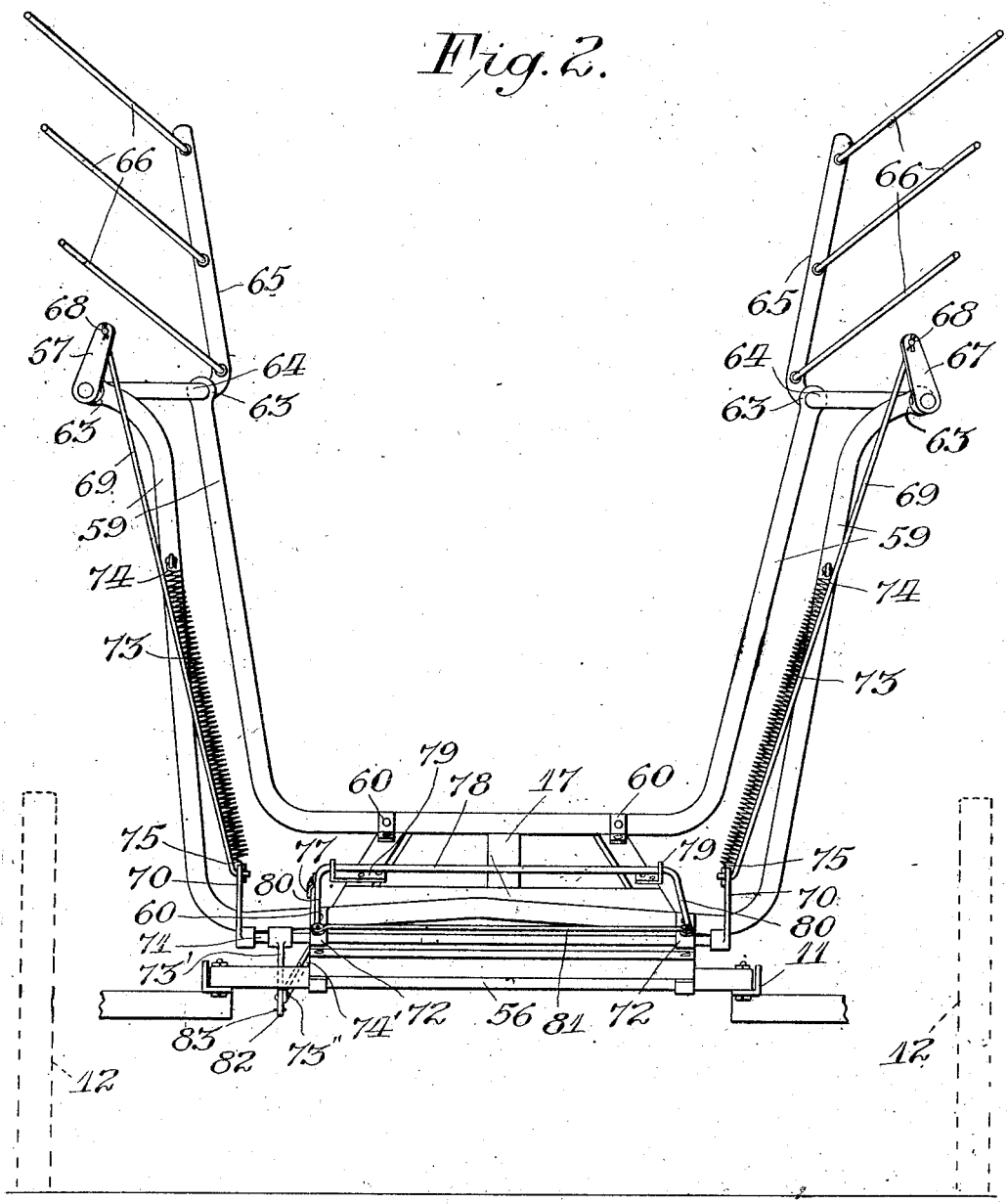

Feb. 24, 1925.
C. R. RANEY
GRAIN SHOCKER
Filed April 17, 1922    3 Sheets-Sheet 3
1,527,821
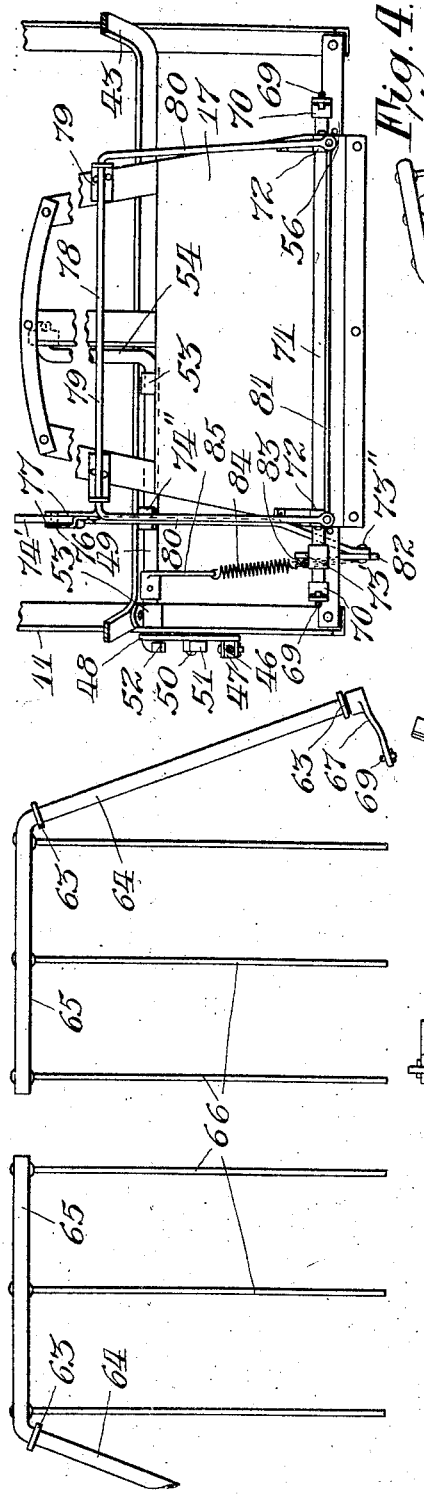
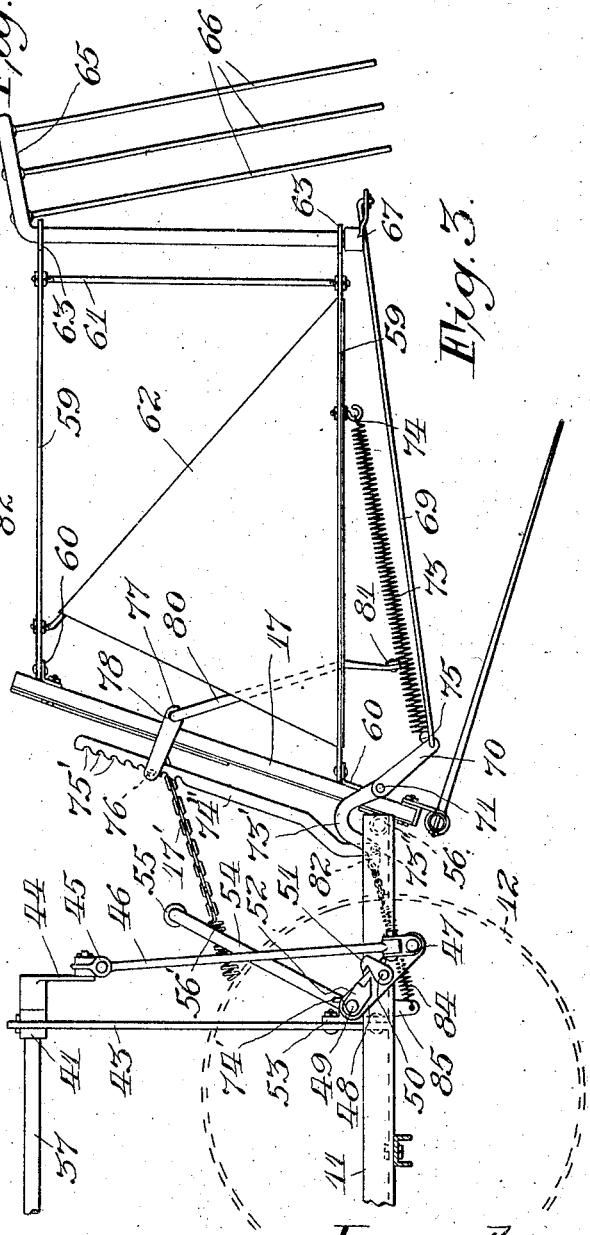
Inventor:
Clemma R. Raney,
By H. P. Doolittle
Atty.

Patented Feb. 24, 1925.

1,527,821

UNITED STATES PATENT OFFICE.

CLEMMA R. RANEY, OF CHICAGO, ILLINOIS, ASSIGNOR TO INTERNATIONAL HARVESTER COMPANY, OF CHICAGO, ILLINOIS, A CORPORATION OF NEW JERSEY.

GRAIN SHOCKER.

Application filed April 17, 1922. Serial No. 553,781.

*To all whom it may concern:*

Be it known that I, CLEMMA R. RANEY, a citizen of the United States, residing at Chicago, in the county of Cook and State of Illinois, have invented certain new and useful Improvements in Grain Shockers, of which the following is a full, clear, and exact specification.

My invention relates to grain shocking machines.

It has for its object to produce an improved and simplified machine which will build and set stable shocks in the field without the necessity of binding the shocks prior to setting up the same.

A further object of my invention is to provide an improvement in connection with the type of shocker which builds the shock in a prostrate position in a receptacle and then tilts the receptacle rearwardly in setting up the shock.

A still further object of my invention is to provide an arrangement or a construction of mechanisms in which the destructive effect or momentum in setting up the shock is overcome or neutralized in a manner to set up a stable shock in the field.

I attain these objects by an improved shocker hereinafter described wherein the shock binding mechanism is omitted. By means of a compressing or stabilizing mechanism actuated by the shock receptacle and controlled by the forward movement of the shocker proper the shock is formed while being set on the ground. The shock is so controlled and guided under all conditions as to insure the production of a firm shock adapted to stand in the field.

In the accompanying drawings I have, for the purposes of illustration, shown one embodiment which my invention may assume in practice in which—

Fig. 2 is a rear elevational view of the shocker showing the manner in which my improvement is mounted on the receptacle;

Fig. 3 is a partial side elevational view showing the receptacle tilted in the position of depositing a shock upon the ground;

Fig. 4 is a partial top plan view showing the mechanism which controls the stabilizing members; and Fig. 5 is a detail view showing the stabilizing members in the compressed or horizontal position.

Figure 1:
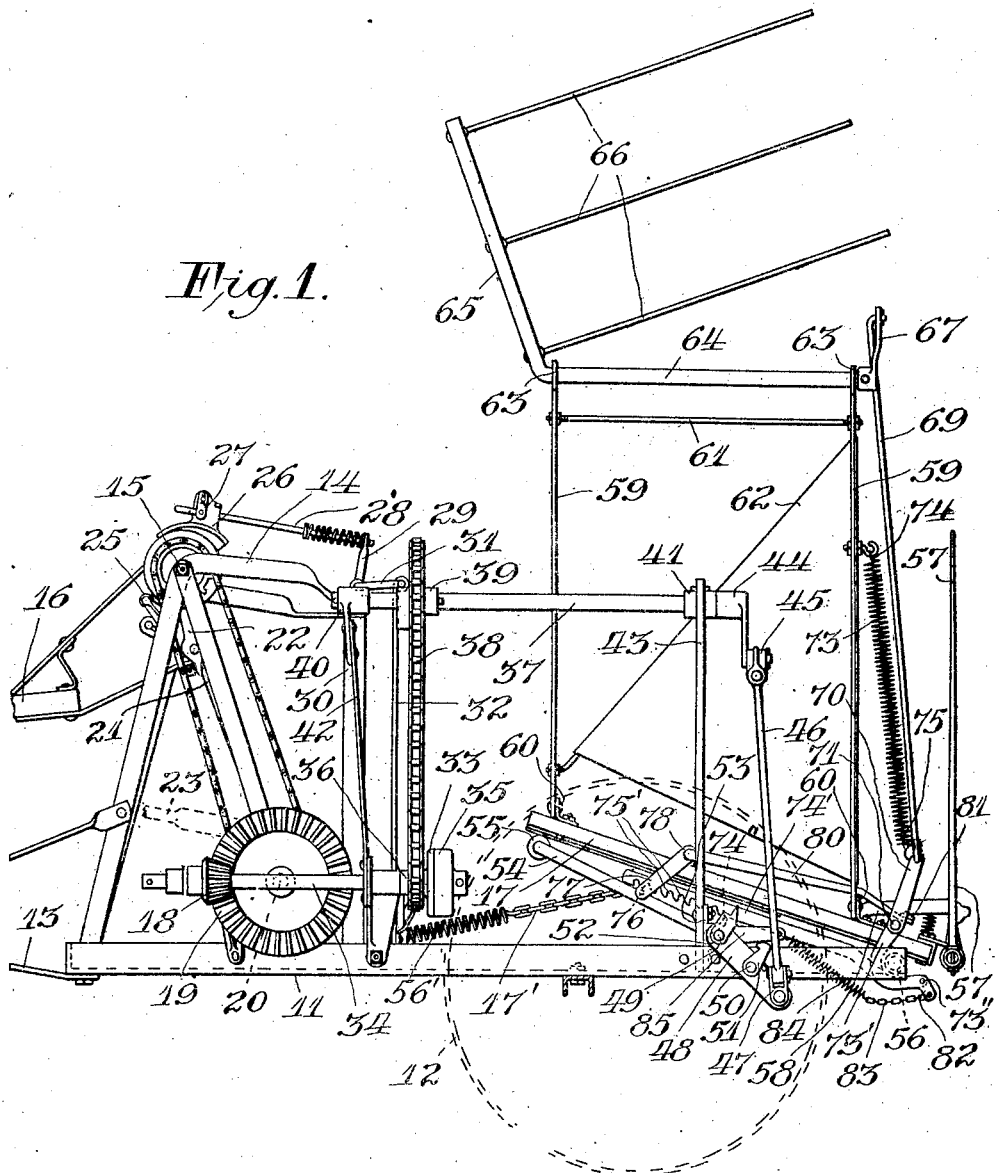
Fig. 1 is a side elevational view of the general type of shocker showing my improvement embodied therein.

The shocker shown is of the general type described in my United States Patent No. 1,202,007, October 17, 1916. As shown, it includes the frame member 11 mounted on the transport wheels 12 and having a tongue 13 adjustably connected to the harvester (not shown), the shocker trailing in the rear and at the stubbleward side of the harvester. Upon the supplemental frame 14 on the front of the main frame 11 is a transverse shaft 15 carrying a longitudinally disposed sheave delivery member 16 normally disposed prostrate beneath the deck of the grain binder and driven upward and rearward from that position to deliver sheaves prostrate in an upwardly and rearwardly movable shock receptacle 17 located at the rear of the frame. The sheaf delivery member 16 is actuated back and forth about its pivot through the power connections which include a suitably driven beveled pinion 18, a meshing bevel gear 19 carried by a cross shaft 20, a resilient pitman connection 21 between a crank (not shown) mounted on the stubbleward end of the shaft 20, and a crank member 22 mounted on the shaft 15 and engageable with the sheaf delivery member. As in the construction described in the above mentioned patent, the sheaf delivery member 16 is also adapted to control the dumping of the shock actuating the dumping mechanism to tilt the receptacle 17 when the butts have reached a predetermined size or height in the latter. A controlling member 25 moving with the sheaf delivery member 16 and normally engageable with the surface of the eccentric cam 26 disposed above the shaft 15 is engageable with the trip 27 when the shock has reached a predetermined size, to thereby actuate a rearwardly extending spring pressed link 28 connected to the clutch controlling crank 29 which is journaled on the supplemental frame member 30 secured to the main frame 11. Positioned adjacent the grainward end of the crank shaft 29 and formed integral therewith is a rearwardly extending arm 31 which is adapted to pivotally receive the connecting rod 32 connected to a pawl (not shown) for controlling the intermittently operating clutch member 33 journaled on the shaft 34 and engageable with the continuously operating clutch member 35 fixed to the shaft 34. The intermittently operating clutch member 33 has formed integrally therewith a sprocket 36 which operatively drives the shaft 37 through the driving mechanism 38 and sprocket 39. The shaft 37 is rotatably positioned in the forward and rearward bearings 40 and 41 fixed to the supplemental frame members 42 and 43 respectively which in turn are secured to the main frame 11. The mechanism for actuating the receptacle 17 to dump the shock comprises a crank 44 secured to the rear end of the shaft 37. The free end of the crank 44 is provided with a universal knuckle 45 and a downwardly extending pitman connection 46. Pivotally secured to the lower end of the pitman connection 46 is a second knuckle connection 47 pivotally secured to a crank 48 journaled on the shaft 49. Pivoted intermedially of the ends of the crank 48 at 50 is a gravity pawl 51 which is adapted to engage a crank 52 fixed to the shaft 49. The shaft 49 extends transversely with respect to the longitudinal frame 11 and is journaled in the bearings 53 secured to the supplemental frame 43. The stubbleward end of the shaft 49 has formed integrally therewith a forwardly extending crank arm 54. The free end of the crank arm 54 has rotatably mounted thereon a roller 55 which is adapted to engage the underside of the receptacle 17 in the operation of actuating the same to a dumping position or from the position shown in Fig. 1 to the position shown in Fig. 3. As above described, the receptacle 17 is pivotally secured to the rear end of the main frame 11 by means of a transversely disposed pipe 56. The receptacle is adapted to be swung about the pipe 56 from the position shown in Fig. 1 to the position shown in Fig. 3 in the normal operation of depositing the shock upon the ground. The receptacle is returned to its normal position, or the position shown in Fig. 1, by an extension spring 56' connected at its forward end to a transverse frame member (not shown) and connected at its rear end to the receptacle 17 by means of the chain 17'. Pivotally secured to the receptacle 17 at the rear end thereof are normally vertically disposed tines 57 which are locked in this position by a spring latch 58 pivoted to the receptacle 17.

My improved shock setting mechanism, wherein no binding mechanism is used comprises substantially two U-shaped members 59 secured to the front and rear ends respectively of the receptacle 17 by means of straps 60. The upper ends of the U-shaped members 59 are braced by the longitudinally disposed brace rods 61 and angularly disposed shield members 62. The upper ends of the U-shaped members are provided with enlarged bearing portions 63 adapted to receive the shaft portions 64 of the stabilizing members 65. The stabilizing members 65 are normally bent at right angles to the shaft portions 64 and are provided at regular intervals with rearwardly and outwardly extending tines 66. The rearward ends of the shaft portions 64 have fixed thereto crank arms 67 which normally prevent the longitudinal displacement of the stabilizing members from their bearings 63 of the U-shaped members 59. The free ends of the cranks 67 are provided with apertures 68 which are adapted to receive connecting rods 69. The lower ends of the connecting rods 69 are pivotally secured to cranks 70 which are fixed to the outer ends of a transversely disposed shaft 71 journaled in the bearings 72 fixed to the receptacle 17. The stabilizing members 65 are normally held in the position shown in Fig. 2 by means of extension springs 73 fixed at their upper ends 74 to U-shaped members 59 and fixed at their lower ends 75 to the cranks 70. Fixed to the shaft 71 adjacent the grassward end thereof is a downwardly and rearwardly curved crank member 73'. Pivotally secured adjacent the free end of the crank member 73' at 73'' is a forwardly extending adjustable connection 74' provided at its free end with a series of notches 75' adapted to engage a pin 76. The pin 76 is supported on oppositely disposed crank members 77 fixed to, or formed integrally with, a transversely disposed shaft 78 pivotally mounted in the forward end of the receptacle 17 by the bearing brackets 79 positioned on the opposite sides of and secured to the frame of the receptacle 17. The shaft 78 is provided at its outer ends with right angularly bent crank portions 80. The crank portions 80 extend rearwardly and have their free ends connected together by transverse bar 81. The bar 81 normally occupies a position in close proximity to the receptacle 17 or, in other words, normally occupies the position shown in Fig. 1. Formed integrally with the crank 73' and extending downward from the pivot 73'' is an angularly inclined portion 82 having an aperture therein adapted to receive a chain 83. The forward end of the chain 83 is connected to the spring 84. The forward end of the spring 84 is pivotally secured to a crank 85 which is fixed to the shaft 49.

In the operation of my improved construction, the sheaf delivery member 16 is tripped into operation by the member 23 and moved upward and rearward to deliver sheaves in the receptacle 17 in the manner described in my Patent No. 1,231,195, June 26, 1917. As it moves to deliver each sheaf, it is also deflected laterally, though not shown or described in the above specification as the same does not form any part of the present invention. The sheaf delivery member oscillates to and fro delivering the sheaves in the receptacle 17 in a manner to build a prostrate shock in the receptacle 17 with the heads of the sheaves on the opposite sides of the receptacle overlapping and the butts diverging. When the butts of the sheaves in the receptacle 17 have reached a predetermined height, the member 25, movable with the fork, engages the trip 27 in such a manner as to reciprocate the clutch controlling member 28 and thereby actuate the crank 29 and crank arm 31 which in turn lifts the connection 32 in a manner to operate the pawl (not shown) which controls the intermittently operating clutch member 33, thus permitting the continuously operating clutch member 35 to engage the intermittently operating clutch member 33 and, through the gearing mechanism 36, 38 and 39, rotate the shaft 37. As the shaft 37 is rotated, the crank 44 is swung upward, swinging the crank 48 upward through the pitman connection 46 and universal connections 45 and 47. When the crank 48 is swung to a predetermined height, the gravity pawl 51 swings about its pivot 50 in a manner to engage the crank 52 and thus when the crank 44 is completing the downward stroke of its cycle, the crank 52 with the shaft 49 is swung in a clock-wise direction and thereby swings the crank 54 upward and rearward and actuates the receptacle 17 about its pivot 56 in a manner to swing the receptacle from the position shown in Fig. 1 to that shown in Fig. 3.

It will be noted that as the crank 52 and shaft 49 are swung in a clock-wise direction, the crank 85 which is fixed to the shaft 49 is also swung in the same direction and thereby swings the crank 73', in a clockwise direction by means of the spring 84 and chain 83 connecting the crank 85 with the crank 73'. This movement of the crank 73' is imparted to the shaft 71 which in turn swings the cranks 70 fixed on the opposite ends of the shaft 71 in a downward and rearward direction and thereby compresses the bundles in the receptacle 17 by the compressor or stabilizing members 65 through the cranks 67 and the connections 69. From this description it will be seen that these compressors or stabilizers 65 are actuated at the time the receptacle 17 is being swung about its axis on the pipe 56. The spring 84 is interposed in this connection for the purpose of taking up or taking care of variations in the size of the shock in the receptacle 17. When the crank 73' is swung in a clockwise direction, it carries forward with it an adjustable connection 74' which is slidably supported on a bracket 74'' fixed to the supplemental frame member 43. It will be noted that this bracket 74'' is normally employed for the purpose of holding the notches 75' of the adjustable connection 74' disengaged from the pin 76 of the cranks 77. As the receptacle 17 is swung upward and rearward about its axis on the pipe 56 and through the various connections above described, the crank 73' is swung in a clock-wise direction and the adjustable connection 74' which is pivotally connected to the crank 73' at 73'' is reciprocated upward with respect to the cranks 77 until one of the notches 75' engages the pin 76 of the cranks 77. It will be noted from the above description that the position that the adjustable connection 74' occupies with respect to the cranks 77 depends entirely upon the size of the shock in the receptacle which is being compressed by the stabilizing members 65. In other words, if the shock built in the receptacle 17 can be compressed through the crank 67, connection 69, crank 70 on the shaft 71 and crank 73' through the spring 84 and chain 83 connected to the crank 85 so that a comparatively small shock is formed, the adjustable connection 74' will be connected to the pin 76 of the cranks 77 with the rearmost notch 75' engaging said pin 76. On the other hand, if the shock in the receptacle 17 is of a comparatively large size, the connections to the compressing or stabilizing members 65 will yield through the spring 84 and thereby one of the intermediate or foremost notches 75' of the adjustable connection 74' will engage the pin 76. The cranks 77 are fixed to the shaft 78 in a manner to be controlled by a cross bar 81 which is adapted to engage the forward side of the shock when the shock is set up in a vertical position in the field. It will thus be seen that a variable connection or an adjustable connection is positioned between the compressing or stabilizing means and controlling means for controlling the stabilizing means. This adjustable or variable connection, it will be understood from the above description, is automatically controlled by the size of the shock built in the receptacle. When the shock in the receptacle 17 is swung or tilted in said receptacle from the position shown in Fig. 1 to the position shown in Fig. 3 the momentum or impact caused by the setting of the shock is overcome or neutralized by the stabilizing members 65 which retain engagement of the shock at the instant the shock strikes the ground. The engagement is gradually released, or, in other words, the stabilizing members 65 are gradually swung outwardly from the shock in their bearings 63 formed on the U-shaped members 59 as the shocker proper is drawn forwardly with the cross bar 81 continuously engaging the forward side of the shock by the crank arms 80 swinging rearwardly about the bearing brackets 79 and thus through the cranks 77, adjustable connection 74', cranks 73', crank arms 70, connection 69 and cranks 67, the stabilizing members 65 are swung outward to entirely release the shock from the receptacle. It will also be understood that the tines 57 pivotally secured to the rear end of the receptacle 17 are automatically released from the latch 58 when the receptacle 17 assumes the position shown in Fig. 3. After the shock has been deposited on the ground and the receptacle has sufficiently released the shock, the receptacle is swung back to its normal bundle receiving position as shown in Fig. 1 by the extension spring 56' and chain 17' and when the receptacle is swung into the position shown in the last named figure, the adjustable connection 74' engages the trip bracket 74" and releases the notch 75' from the pin 76, thus permitting the crank arms 80 and cross bar 81 to assume their normal position or the position shown in Fig. 1 and also permitting the compressing arms or stabilizing members 65 to assume their normal position or the position shown in Figs. 1 and 2 by means of the springs 73.

While I have, in this application, specifically described one embodiment which my invention may assume in practice, it is to be understood that the form thereof illustrated herein is used for the purpose of description and that the invention is not limited thereto.

What I claim as my invention and desire to secure by Letters Patent is:

1. In a grain shocker, a frame, a receptacle pivotally carried by said frame, means for building a shock in and setting a shock from said receptacle, means for neutralizing the momentum imparted to the shock in setting, and means governed by the size of the shock built in the receptacle for controlling the operation of the last named means.

2. In a grain shocker, a frame, a receptacle pivotally carried by said frame, means for building a shock in and setting a shock from said receptacle, means engageable with the rear of the shock for neutralizing the momentum imparted to the shock in setting, and means governed by the size of the shock built in the receptacle for controlling the operation of the last named means.

3. In a shocking machine, a frame, a shock setting receptacle thereon, means connected with said receptacle adapted to engage the rearward side of the shock set by said receptacle, and means engageable with the forward side of said shock for controlling said first named means.

4. In a shocking machine, a frame, a shock setting receptacle thereon, means connected with said receptacle adapted to engage the rearward side of the shock set by said receptacle, and means connected to said receptacle and engageable with the forward side of said shock for controlling the first named means.

5. In a shocking machine, a frame, a shock setting receptacle thereon, means connected with said receptacle adapted to engage the rearward side of the shock set by said receptacle, and means engageable with the forward side of said shock for controlling said first named means, said second named means being actuated by the movement of said machine with respect to the shock set.

6. In a grain shocker, a frame, a receptacle carried by said frame, means associated with said receptacle for stabilizing the shock set from said receptacle, and means including a variable connection connected to said first named means for controlling said first named means.

7. In a grain shocker, a frame, a receptacle pivotally carried by said frame, means connected to said receptacle for stabilizing the shock set from said receptacle, means for controlling said first named means, and a variable connection connecting both of said means.

8. In a grain shocker, a frame, a receptacle pivotally carried by said frame, means connected to said receptacle for stabilizing the shock set from said receptacle, and means carried by said receptacle for controlling said first named means, and a variable connection connecting both of said means.

9. In a grain shocker, a frame, a receptacle pivotally carried by said frame, means connected to said receptacle for stabilizing the shock set from said receptacle, means for controlling said first named means, and an automatically adjustable connection connecting both of said means.

10. In a grain shocker, a frame, a receptacle pivotally carried by said frame, means connected to said receptacle for stabilizing the shock set from said receptacle, means for controlling said first named means, and an automatically adjustable connection connecting both of said means controlled by the size of the shock in said receptacle.

11. In a grain shocker, a frame, a receptacle pivotally carried by said frame, means connected to said receptacle for stabilizing the shock set from said receptacle, means pivotally mounted on said receptacle for controlling said first named means, and a variable connection connecting both of said means.

12. In a grain shocker, a frame, a dumping receptacle carried by said frame, means for building a shock in and setting a shock from said receptacle, means engageable with the shock for neutralizing the momentum imparted to the shock in dumping, and means automatically governed by the size of the shock built in the receptacle for controlling the operation of the neutralizing means.

13. In a grain shocker, a frame, a dumping receptacle carried by said frame, means for building a shock in and setting a shock from said receptacle, means engageable with the shock for neutralizing the momentum imparted to the shock in dumping, and an adjusting means carried in the receptacle automatically governed by the size of the shock built in the receptacle for controlling the operation of the neutralizing means.

14. In a grain shocker, a frame, a dumping shock receptacle carried thereby, means for dumping said receptacle after a shock has been built therein, means for compressing the shock while the receptacle is being dumped, and means governed by the size of the shock built in said receptacle for controlling the operation of said shock compressing means.

15. In a grain shocker, a frame, a dumping shock receptacle carried thereby, means for dumping said receptacle after a shock has been built therein, means for compressing the shock while the receptacle is being dumped, and an automatically adjustable means governed by the size of the shock built in said receptacle for controlling the operation of said shock compressing means.

In testimony whereof I affix my signature.

CLEMMA R. RANEY.